J. H. & T. K. BARLEY.
Harrow-Teeth Fastening.

No. 205,520. Patented July 2, 1878.

WITNESSES:
Francis McArdle.
C. Sedgwick.

INVENTOR:
J. H. Barley
T. K. Barley
BY Munn & Co
ATTORNEYS.

UNITED STATES PATENT OFFICE.

JAMES H. BARLEY AND THOMAS K. BARLEY, OF SEDALIA, MISSOURI.

IMPROVEMENT IN HARROW-TEETH FASTENINGS.

Specification forming part of Letters Patent No. 205,520, dated July 2, 1878; application filed May 18, 1878.

*To all whom it may concern:*

Figure 1:
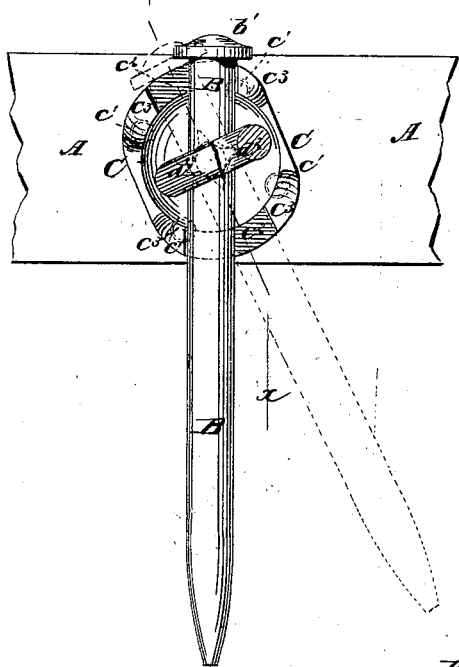
Figure 2:
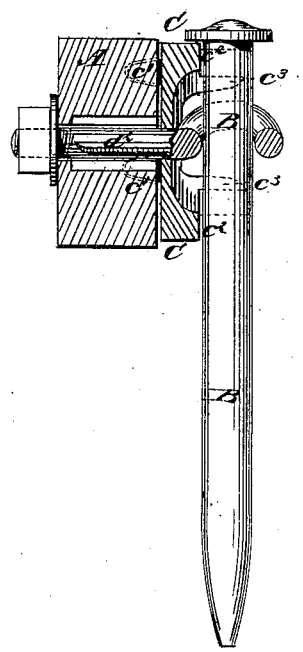
Figure 3:
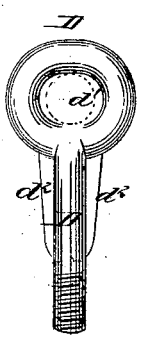

Be it known that we, JAMES H. BARLEY and THOMAS K. BARLEY, of Sedalia, in the county of Pettis and State of Missouri, have invented a new and useful Improvement in Harrow-Teeth Fastenings, of which the following is a specification:

Figure 1 is a face view of one of our improved fastenings, shown as securing a harrow-tooth to the side of a bar of the frame. Fig. 2 is a section of the same, taken through the line $x$ $x$, Fig. 1. Fig. 3 is a detail side view of the eyebolt.

Similar letters of reference indicate corresponding parts.

The object of this invention is to furnish fastenings for securing harrow-teeth to the side of the bars of a harrow-frame in such a way that the teeth may be held in a vertical, inclined, or horizontal position parallel with the bars, and which shall be simple in construction, strong, durable, and reliable, holding the teeth securely, and not allowing them to get out of place.

The invention consists in the teeth-holder plates made with teeth or points upon their inner sides, and with tooth bearings and stops or lugs projecting from their outer sides, and the eyebolts made with elongated eyes upon their rear ends and pins or wings upon the opposite sides of their rear parts, in combination with the teeth and the bars of the harrow-frame, as hereinafter fully described.

A represents the bars of a harrow-frame, which is constructed in the usual way. B are the harrow-teeth, which are made of round steel rods, are tapered to a point at one end, and have button-shaped heads $b'$ formed upon their other ends, the lower sides of the said heads being at right angles with the length of the teeth.

C are the teeth-holders, which are made in the form of oblong, circular, or rhombic plates, as desired, with teeth or points $c^1$ upon their inner sides to enter holes in the sides of the bars A to keep the said holders from turning.

Upon the face of the holder-plates C are formed bearings $c^2$ to receive the teeth B, said bearings being made of such a length as to allow the teeth B to move through an angle of about forty-five degrees (45°).

The teeth B, when in working position, rest against the shoulders of the lugs or stops $c^3$ at the alternate ends of the bearings $c^2$.

The teeth-holder plates C have holes through their centers for passage of the bolts D, which bolts also pass through the bars A, and have nuts screwed upon their forward ends.

The bolts D have eyes $d^1$ formed upon their rear ends, which eyes are elongated, so as to allow the teeth B to swing through an angle of about forty-five degrees (45°) without striking against the ends of the said eye.

The rear part of the bolt D has pins or wings $d^2$ formed upon its opposite sides, which pass through notches in the plates C at the opposite sides of the bolt-holes, and through notches in the body of the bar A, and thus prevent the said bolts from turning.

With this construction, when the harrow is drawn one end forward the resistance of the soil will cause the teeth B to take, and will hold them firmly in, a vertical position, as shown in full lines in Fig. 1; and when the harrow is drawn the other end forward, the resistance of the soil will cause the teeth to take, and will hold them in, an inclined position, as shown in dotted lines in Fig. 1.

With this construction, also, by loosening the bolts D and turning the holders C one-quarter around, the teeth B may be turned up into a horizontal position parallel with the bars A, for convenience in transportation.

We are aware that harrow-teeth have been adjustably secured to beams by means of supporting-plates and looped or hooked fastening-bolts.

Having thus described our invention, we claim as new and desire to secure by Letters Patent—

The teeth-holder plates C, made with teeth or points $c^1$ upon their inner sides, with tooth-bearings $c^2$, and with stops or lugs $c^3$ projecting from their outer sides, and the eyebolts D, made with elongated eyes $d^1$ upon their rear ends and fins or wings $d^2$ upon the opposite sides of their rear parts, in combination with the teeth B and the bars A of the harrow-frame, substantially as herein shown and described.

JAMES HANLEY BARLEY.
THOMAS KINCAID BARLEY.

Witnesses:
H. R. DOBYNS,
WILLIAM SCOTT.